(12) United States Patent
Hashimoto et al.

(10) Patent No.: US 7,293,820 B2
(45) Date of Patent: Nov. 13, 2007

(54) WEATHER STRIP FOR MOTOR VEHICLE

(75) Inventors: Atsushi Hashimoto, Aichi (JP);
Masahiro Nozaki, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/313,947

(22) Filed: Dec. 22, 2005

(65) Prior Publication Data

US 2006/0138801 A1    Jun. 29, 2006

(51) Int. Cl.
*B60J 10/08* (2006.01)
(52) U.S. Cl. ............... 296/146.9; 296/154; 296/93; 49/490.1
(58) Field of Classification Search ........... 296/107.04, 296/213; 49/498.1
See application file for complete search history.

(56) References Cited

U.S. PATENT DOCUMENTS

| | | | |
|---|---|---|---|
| 3,167,856 A * | 2/1965 | Zoller ................. | 29/413 |
| 5,154,952 A | 10/1992 | Nozaki | |
| 5,249,353 A * | 10/1993 | Kranz ................. | 29/446 |
| 5,304,409 A | 4/1994 | Nozaki | |
| 5,527,583 A | 6/1996 | Nozaki | |
| 5,715,632 A | 2/1998 | Nozaki | |
| 5,791,722 A | 8/1998 | Nozaki et al. | |
| 5,852,898 A | 12/1998 | Hikosaka et al. | |
| 6,012,760 A | 1/2000 | Nozaki | |
| 6,047,872 A * | 4/2000 | Kii et al. ............... | 225/97 |
| 6,213,536 B1 * | 4/2001 | Raisch et al. ........ | 296/146.9 |
| 6,435,597 B1 * | 8/2002 | Anders et al. ........ | 296/107.07 |
| 6,520,563 B2 * | 2/2003 | Nozaki ................ | 296/146.9 |
| 6,539,671 B2 | 4/2003 | Yamaguchi et al. | |
| 6,814,393 B2 * | 11/2004 | Nagata ................ | 296/146.9 |
| 6,820,372 B2 | 11/2004 | Nozaki | |
| 6,837,005 B2 * | 1/2005 | Arata et al. .......... | 49/440 |
| 6,874,281 B2 * | 4/2005 | Fujita et al. ......... | 49/490.1 |
| 7,044,525 B2 * | 5/2006 | Miyakawa et al. .... | 296/1.08 |

FOREIGN PATENT DOCUMENTS

| | | |
|---|---|---|
| JP | A-04-081848 | 7/1992 |
| JP | U-05-086714 | 11/1993 |
| JP | A-06-048258 | 2/1994 |
| JP | A-2001-088627 | 4/2001 |
| JP | A-2001-151035 | 6/2001 |
| JP | A-2002-144978 | 5/2002 |

* cited by examiner

*Primary Examiner*—Dennis H. Pedder
*Assistant Examiner*—Greg Blankenship
(74) *Attorney, Agent, or Firm*—Posz Law Group, PLC

(57) ABSTRACT

A weather strip for a motor vehicle, which is capable of being attached to a flange provided in an opening portion of a vehicle body or a closing member for closing the opening portion irrespective of a configuration of the flange. The weather strip includes a base portion in which the flange provided in the opening portion or the closing member is adapted to be inserted, and a seal portion integrally formed with the base portion for sealing between the opening portion and the closing member. An extension wall extends from an end of an outer side wall of the base portion by way of a bending part. The extension wall is bonded to a body panel defining the opening portion or the closing member, which is adjacent to the flange, with a double-sided adhesive tape.

8 Claims, 6 Drawing Sheets

WEATHER STRIP FOR MOTOR VEHICLE

CROSS-REFERENCE TO RELATED APPLICATION

This application is related to and claims priority from Japanese patent application No. 2004-375471, incorporated herein by reference.

BACKGROUND OF THE INVENTION

1. Field of the Invention

The present invention relates to a weather strip for providing a seal between an opening portion of a vehicle body and a closing member for closing the opening portion, such as a vehicle door, a luggage door, a sliding roof, etc.

2. Description of Related Art

Figure 1:
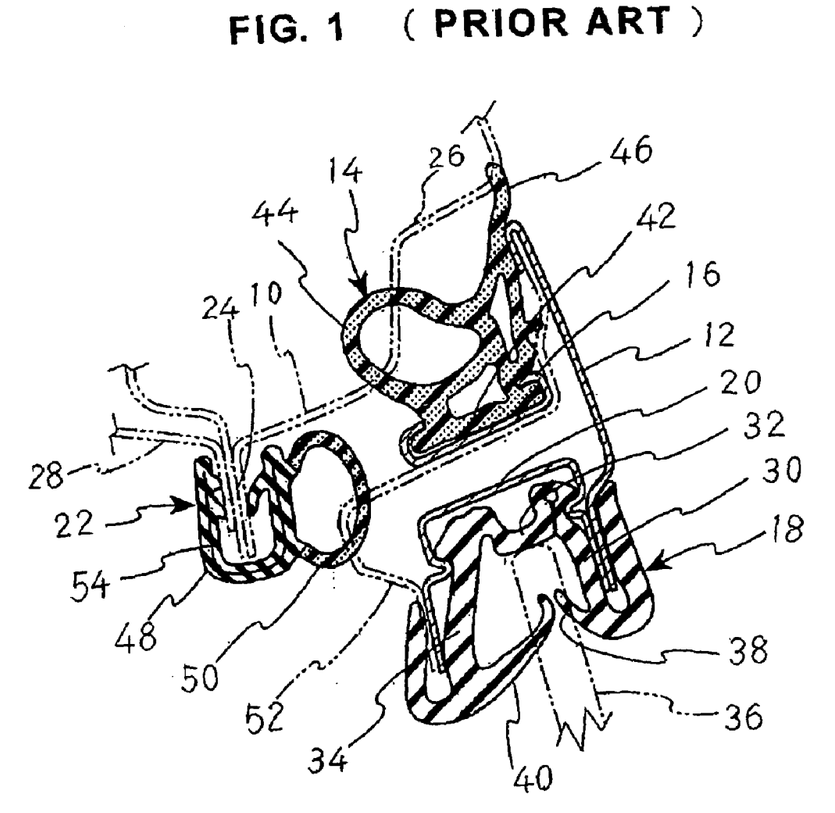
FIG. 1 is a cross-sectional view of a conventional sealing structure between a door opening portion of a vehicle body and a vehicle door, which includes one example of a conventional door opening trim weather strip.

FIG. 1 is a cross-sectional view of a conventional sealing structure between a door opening portion of a vehicle body and a vehicle door. As shown, to provide a seal between a door opening portion 10 and a vehicle door 12, a door weather strip 14 is attached to a retainer 16 provided along an outer periphery of a door frame, a glass run 18 is attached to a channel 20 provided along an inner periphery of the door frame, and a door opening trim weather strip 22 is attached to a flange 24 projecting from the door opening portion 10. The flange 24 is formed by joining end edges of an outer body panel 26 and an inner body panel 28 of the vehicle body.

The glass run 18 includes an outer side wall 30, a bottom wall 32 and an inner side wall 34, and has a generally U-shaped cross-section. When a door glass 36 is raised, an end of the door glass 36 enters the glass run 18, and is sealed with an outer seal lip 38 and an inner seal lip 40.

The door weather strip 14 attached to the outer periphery of the door 12 includes a base portion 42, a tubular seal portion 44 integrally formed on the base portion 42, and a seal lip 46. The base portion 42 is secured to the door frame by fitting the base portion 42 in the retainer 16 provided along the outer periphery of the door frame. When the door 12 is closed, the seal lip 46 contacts an outer end of the door opening portion 10 and the tubular seal portion 44 contacts a protruding part of the door opening portion 10 on the inner side of the contacting position of the seal lip 46 to provide a double seal between the door opening portion 10 and the vehicle door 12.

The door opening trim weather strip 22 attached to the flange 24 provides a seal between the door opening portion 10 and the vehicle door 12 on the inner side of the contacting position of the tubular seal portion 44 of the door weather strip 14. The door opening trim weather strip 22 includes a base portion 48 having a U-shaped cross-section and a tubular seal portion 50. The base portion 48 is attached to the flange 24 and the tubular seal portion 50 contacts a protruding part 52 of the door frame to provide a seal between the door opening portion 10 and the vehicle door 12. An insert member 54 such as a metal insert, etc. is embedded in the base portion 22, and lips are provided in the base portion 22 for holding the flange 24.

Figure 2:
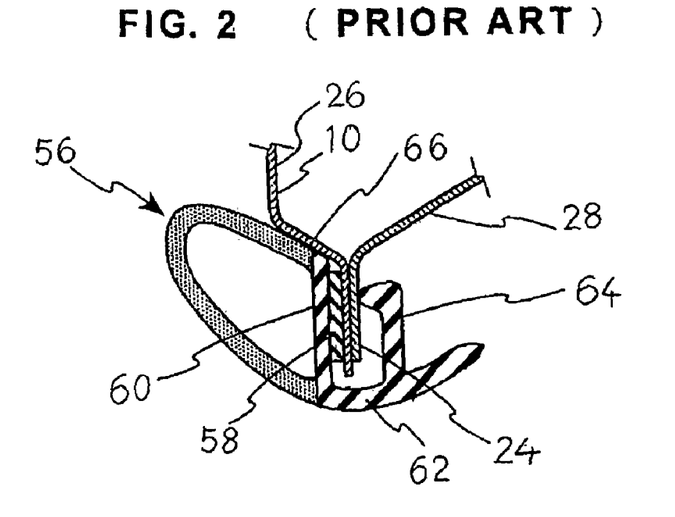
FIG. 2 is a partially cut away cross-sectional view of another example of a conventional door opening trim weather strip which is attached to one position of the door opening portion.

In another example shown in FIG. 2, a door opening trim weather strip 56 is attached to the flange 24 with a double-sided adhesive tape 58 (See Publications of unexamined Japanese patent applications Nos. 2002-144978, Hei6-48258, ex.). In this case, the double-sided adhesive tape 58 previously bonded to an inner surface of an outer side wall 60 of a base portion 62 is bonded to an outer surface of the flange 24 inserted in the base portion 62.

Figure 3:
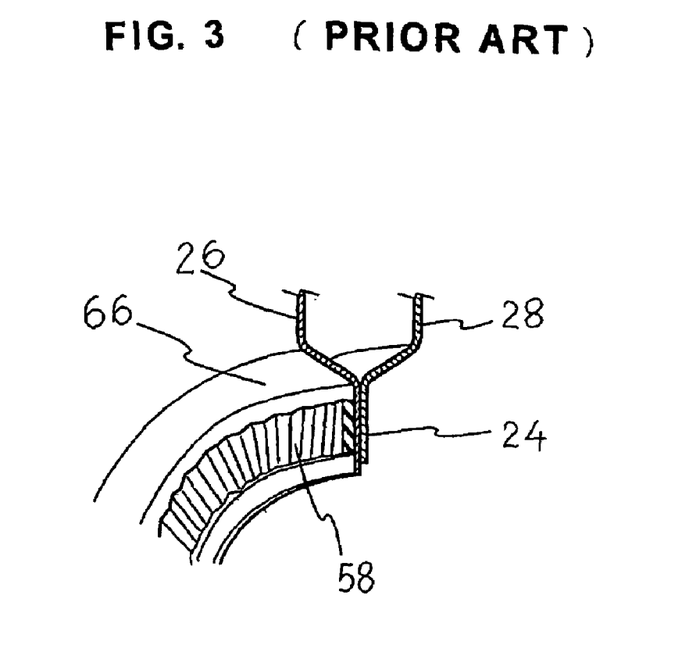
FIG. 3 is a perspective view showing the bonding state of a double-sided adhesive tape to a flange of the door opening portion in the another example of the conventional door opening trim weather strip.

The flange 24 is formed by spot-welding of a plurality of body panels. Due to spot welding, concaved parts are formed in surfaces of the flange 24. In addition, the body panels forming the flange 24 may have notches, and the number of the body panels forming the flange 24 differs according to the position in the door opening portion 10 to vary the thickness of the flange 24. Consequently, stable bonding with the double-sided adhesive tape may not be effected. In addition, as shown in FIG. 3, at a corner of the flange 24, the double-sided adhesive tape 58 is not curved uniformly in its widthwise direction so as not to be bonded to the corner of the flange 24 favorably. Consequently, the double-sided adhesive tape 58 may peel off the corner of the flange 24.

To solve this disadvantage, it has been proposed to bond the double-sided adhesive tape 58 not to the flange 24 but to a flat part 66 defined by the outer body panel 26 which bends outwardly of the flange 24.

Figure 4:
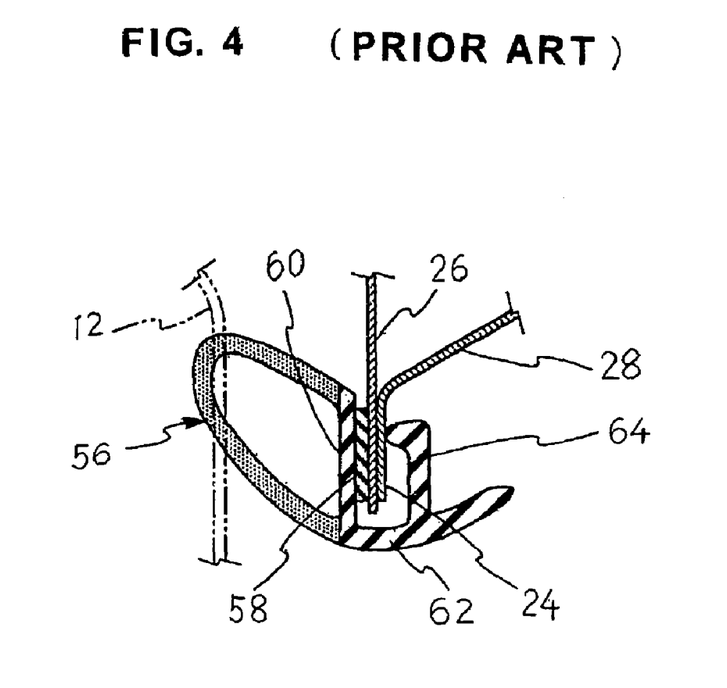
FIG. 4 is a partially cut away cross-sectional view showing the attaching state of the another example of the conventional door opening trim weather strip to another position of the door opening portion.

In the door opening portion 10 along a front pillar above the door belt line, ex., there is the flat part suited to bond the double-sided adhesive tape, but, under the door belt line, the outer body panel 26 extends vertically without bending. So, under the door belt line, as shown in FIG. 4, the double-sided adhesive tape 58 is bonded to the flange 24 or the outer body panel 26 extending vertically of the flange 24.

In still another example, the door opening trim weather strip is formed to have an L-shaped cross-section, and a tubular seal portion composed of a sponge rubber is formed along one end of the L-shaped door opening trim weather strip. The tubular seal portion thus arranged is attached to the door opening portion using a clip and a double-sided adhesive tape (See Publication of unexamined Japanese utility model application No. Hei5-86714, ex.).

In this example, the soft tubular seal portion is secured to the door opening portion so that the door opening trim weather strip cannot be attached stably. And the tubular seal portion composed of the sponge rubber must be formed to conform to the configuration of the door opening portion so that where the configuration of the door opening portion varies, and where the thickness of the flange varies, the tubular seal portion cannot be secured to the door opening portion favorably.

SUMMARY OF THE INVENTION

Accordingly, it is an object of the present invention to provide a weather strip for a motor vehicle, which can be securely attached to an opening portion of a vehicle body, etc. irrespective of the configuration of a flange provided in the opening portion, etc.

In accordance with the present invention, a weather strip for a motor vehicle, which is capable of providing a seal between an opening portion of a vehicle body, and a closing member for closing the opening portion, includes a base portion in which a flange provided in the opening portion or the closing member is adapted to be inserted, and a seat portion integrally formed with the base portion for contacting the opening portion or the closing member, and sealing a gap between the opening portion and the closing member. The base portion has a generally U-shaped cross-section or a generally J-shaped cross-section, and has an outer side wall, an inner side wall and a bottom wall. The outer side wall has a bending part along an open end thereof, and further extends to define an extension wall. The extension wall is bonded to a body panel defining the opening portion or the closing member, which is adjacent to the flange, with a double-sided adhesive tape.

With this arrangement, the weather strip includes a base portion in which a flange provided in the opening portion or the closing member is adapted to be inserted, and a seal portion integrally formed with the base portion for contacting the opening portion or the closing member, and sealing a gap between the opening portion and the closing member so that when the base portion is attached to the opening portion or the closing member, the seal portion contacts the opening portion or the closing member and provides a seal between the closing member and the opening portion in the closing state of the closing member.

The base portion has a generally U-shaped cross-section or a generally J-shaped cross-section, and has an outer side wall, an inner side wall and a bottom wall so that the flange provided In the opening portion or the closing member is inserted in an interior of the base portion, and a projecting end of the flange is covered with the outer side wall, the inner side wall and the bottom wall. Therefore, where the wall thickness of the flange varies, the weather strip can be readily attached to the flange.

The outer side wall has a bending part along an open end thereof, and further extends to define an extension wall, and the extension wall is bonded to a body panel defining the opening portion or the closing member, which is adjacent to the flange, with a double-sided adhesive tape over the entire length of the weather strip. With this arrangement, where the body panel of the opening portion bends angularly or extends straight relative to the flange, the bending part of the outer side wall locally bends to conform to the configuration of the opening portion such that the extension wall extends along the body panel of the opening portion, and consequently, the extension wall is bonded to the body panel with the double-sided adhesive tape over the entire length of the opening portion, whereby the weather strip can be attached to the opening portion securely.

It is preferable that the bending part is formed by decreasing a wall thickness along an open end of said outer side wall of said base portion.

With this arrangement, the bending part having a thin wall thickness enables the extension wall to be readily flexed. Therefore, the double-sided adhesive tape bonded to the extension wall is bonded to the closing member or the opening portion, whereby the weather strip can be attached securely. In addition, the bending part having a thin wall thickness can be formed during the extrusion of the weather strip so that the production thereof is facilitated.

It is preferable that the bending part is composed of a soft material.

By composing the bending part of a soft material, the extension wall can readily flex at the bending part, and accordingly, the double-sided adhesive tape bonded to the extension wall is bonded to the closing member or the opening portion, whereby the weather strip can be attached securely. In addition, the bending part composed of the soft material can be flexibly bent to conform to the configuration of the opening portion.

It is preferable that an inner surface of the outer side wall of the base portion is further bonded to the flange with a double-sided adhesive tape. With this arrangement, the base portion of the weather strip can be bonded to the closing member or the opening portion with two double-sided adhesive tapes in two positions, the weather strip can be attached more securely without any slippage.

It Is preferable that an insert member is embedded in the base portion such that the insert member can be separated in the base portion into a plurality of insert pieces, or can be stretched and contracted in the base portion. With this arrangement, the insert member embedded in the base portion enhances the holding strength of the base portion against the flange, and enables the base portion to flexibly bend along a corner of the closing member or the opening portion to conform to the configuration thereof.

It is preferable that the base portion is composed of a solid material, whereas the seal portion is composed of a sponge material and formed to have a tubular configuration.

By composing the base portion of the solid material, the base portion can surely hold the flange provided in the closing member or the opening portion. And by composing the seal portion of the sponge material and forming it to have a tubular configuration, the seal portion can flexibly contact the closing member or the opening portion with improved sealing properties.

It is preferable that the seal portion is composed of a sponge material of an EPDM rubber or a thermoplastic olefin elastomer, and the base portion is composed of a solid material of an EPDM rubber or a thermoplastic olefin elastomer. With this arrangement, the seal portion and the base portion can be formed simultaneously by extruding a same kind of a material, whereby a resultant weather strip exhibits good weather resistance. The EPDM rubber is an olefin-based material, similarly to the thermoplastic olefin elastomer so that the weather strip can be readily recycled without dividing the base portion and the seal portion from each other.

It is preferable that the extension wall is bonded to the body panel adjacent to the flange with the double-sided adhesive tape over the entire length of the weather strip with a bending angle of the bending part locally varied. With this arrangement, where the angle between the flange and the body panel adjacent to the flange varies, the weather strip can be surely attached according to variations in bending angle.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, one embodiment of the present invention will be explained. In this embodiment, the present invention is applied to a door opening trim weather strip. The present invention is also applicable to other weather strips each being attached to an opening portion of a vehicle body, or a closing member for closing the opening portion, such as a luggage weather strip, etc.

Figure 5:
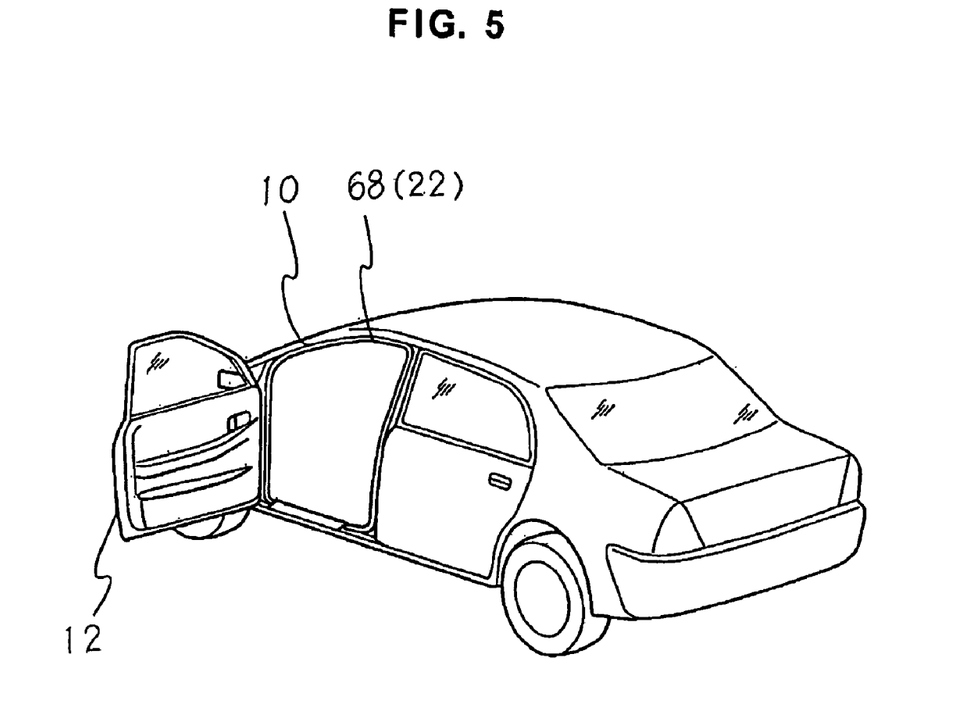
FIG. 5 is a perspective view of a vehicle body, which shows an attaching state of a door opening trim weather strip as one example of a weather strip in accordance with the present invention.
Figure 6:
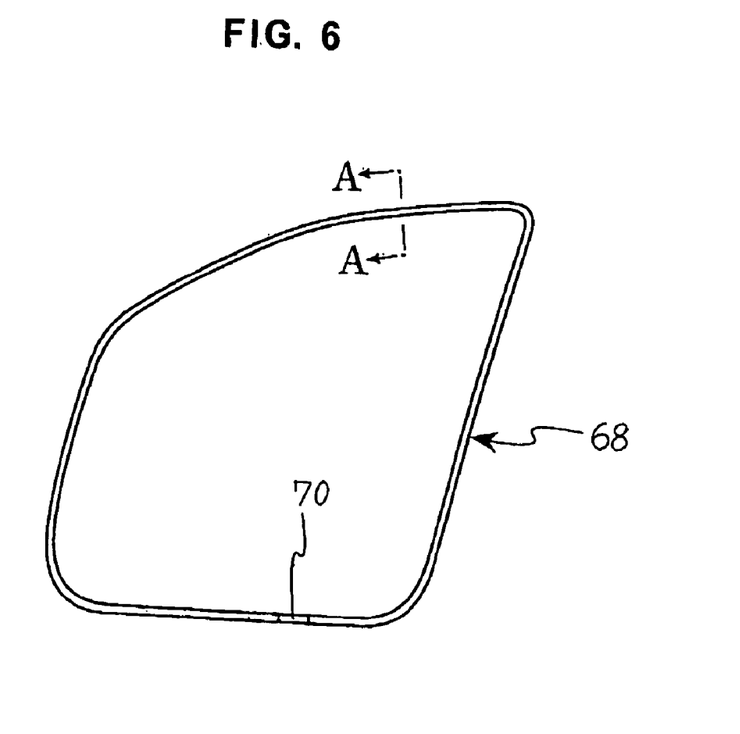
FIG. 6 is a front view of the door opening trim weather strip of FIG. 5.

FIG. 5 is a perspective view of a motor vehicle. A door opening portion 10 of a vehicle body is formed around a door opening of the motor vehicle, which is closed by a vehicle door 12, and a door opening trim weather strip 68 is attached to the door opening portion 10. The door opening trim weather strip 68 is formed by extrusion into a linear configuration, and is attached along the door opening portion 10 into a ring-shaped configuration. After attaching, ends of the door opening trim weather strip 68 are connected to each other. As shown in FIG. 6, the ends of the door opening trim weather strip 68 may be connected to each other with a connection 70 which is formed by molding. Alternatively, the ends of the door opening trim weather strip 68 may be bonded to each other into a ring-shaped configuration before attaching to the door opening portion 10.

Figure 7:
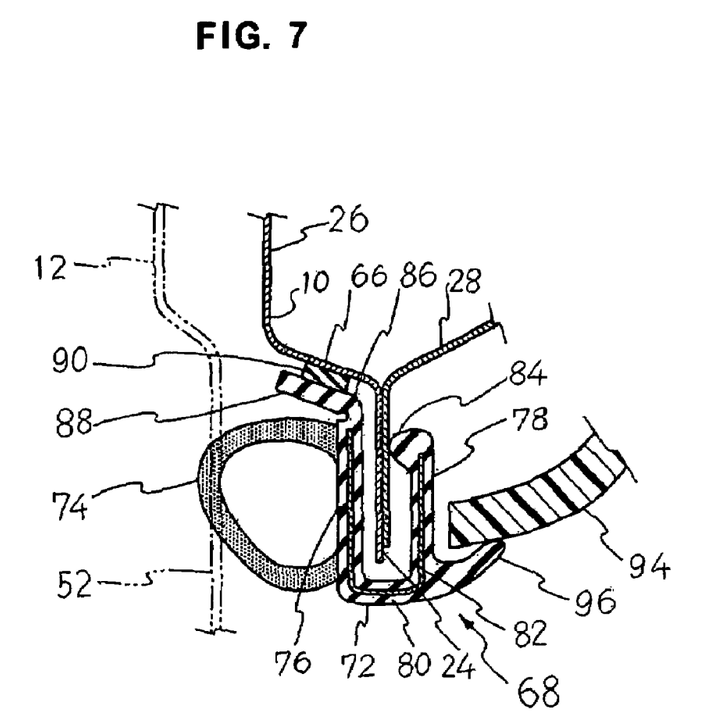
FIG. 7 is a cross-sectional view of the door opening trim weather strip, which is taken along the line of A-A of FIG. 6.
Figure 8:
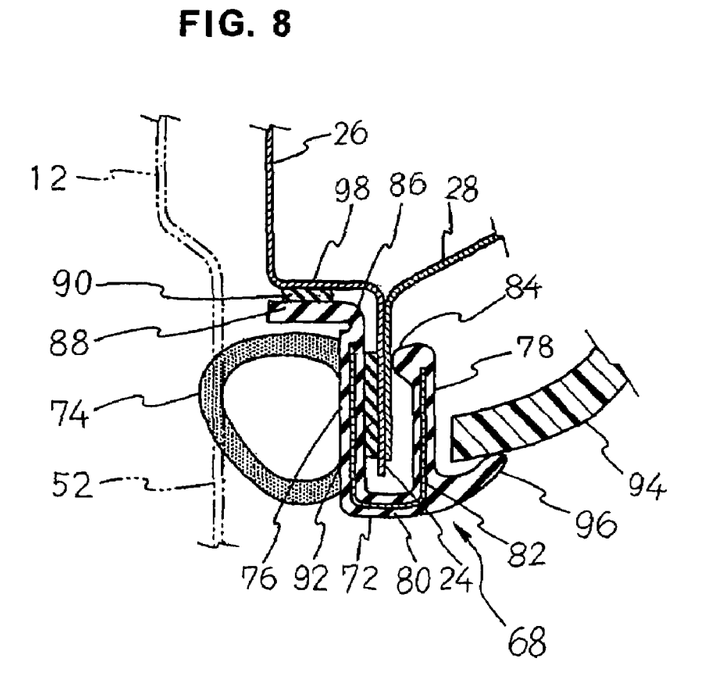
FIG. 8 is a cross-sectional view of the door opening trim weather strip, which is taken along a different line from that of FIG. 7.

FIG. 7 is a cross-sectional view of the door opening trim weather strip 68 attached to the door opening portion 10, which is taken along the line A-A of FIG. 6. FIG. 8 is a cross-sectional view of the door opening trim weather strip 68 attached to the door opening portion 10, which is taken along a different line from the line A-A of FIG. 6.

As shown in FIG. 7, the door opening trim weather strip 68 is attached to a flange 24 that is formed by welding ends of an outer body panel 26 and an inner body panel 28 together. The door opening trim weather strip 68 has a base portion (trim portion) 72 for attachment to the flange 24, and a tubular seal portion 74 for contacting a protruding part 52 of a door frame of the door 12 and providing a seal between the door 12 and the door opening portion 10.

The trim portion 72 includes an outer side wall 76, an inner side wall 78 and a bottom wall 80, and has a U-shaped cross-section. To enhance the holding force of the trim portion 72 against the flange 24, an insert member 82 may be embedded in the trim portion 72.

The insert member 82 is composed of a metal sheet, metal wire, or a hard synthetic resin. In case of the metal sheet or the hard synthetic resin, a large number of strip-shaped insert pieces are arranged in parallel with each other in a longitudinal direction of the trim portion 72, and connected to each other into a ladder-shaped configuration or a fish bone-shaped configuration. Alternatively, a large number of strip-shaped insert pieces are arranged In a longitudinal direction of the trim portion 72, and connected to each other into a zigzag configuration. To enhance the flexibility of the trim portion 72, after embedded, the insert member 82 may be cut at every one or more connections of the strip-shaped insert pieces. The zigzag insert member 82 exhibits elasticity and flexibility in a longitudinal direction thereof. In case of the metal wire, it is used as a wire carrier type member prepared by bending the metal wire to a zigzag configuration and holding it with a plural number of threads in a longitudinal direction thereof.

A plurality of holding lips may be provided in the outer side wall 76 and the inner side wall 78, respectively, so as to obliquely extend toward the bottom wall 80 in an interior of the trim portion 72. In the present embodiment, a projection 84 is formed along an open end of the inner side wall 78 so as to project towards the flange 24. When the flange 24 is inserted in the interior of the trim portion 72, the projection 84 contacts an inner surface of the flange 24 to hold the door opening trim weather strip 68. And where the holding lips are provided, they contact the inner and outer surfaces of the flange 24 to hold the door opening trim weather strip 68.

A bending part 86 is provided along an open end of the outer side wall 76, and an extension wall 88 extends from the bending part 86. The configuration of the bending part 86 will be explained later. A double-sided adhesive tape 90 is bonded to an inner surface of the extension wall 88.

The tubular seal portion 74 is integrally formed on an outer surface of the outer side wall 76 to have a generally elliptical cross-section. The tubular seal portion 74 is composed of a sponge material such as a sponge rubber, a sponge thermoplastic elastomer, etc. When the door 12 is closed, the tubular seal portion 74 contacts the protruding part 52 of the door 12 to provide a seal between the door 12 and the door opening portion 10.

End edges of the outer body panel 26 and the inner body panel 28 are welded together to define the flange 24. The outer body panel 26 bends and extends obliquely upwardly of the flange 24 to define a flat part 66, and further bends upwardly. The inner body panel 28 bends and extends obliquely upwardly.

Upon attaching the door opening trim weather strip 68 to the door opening portion 10, the flange 24 is inserted in the interior of the trim portion 72, and the double-sided adhesive tape 90 bonded to the extension wall 88 is pressed against the flat part 66 to bond the double-sided adhesive tape 90 to the flat part 66. Where the bending angle of the outer body panel 26 varies in the vicinity of the flange 24, the bending part 86 flexes such that the double-sided adhesive tape 90 bonded to the extension wall 88 contacts the flat part 66 of the outer body panel 26. Consequently, the door opening trim weather strip 68 can be attached to the door opening portion 10 with the double-sided adhesive tape 90. And the projection 84 provided in the inner side wall 78 contacts the flange 24 to hold the door opening trim weather strip 68. The flat part 66 of the outer body panel 26 is free from any concaved part caused by the spot welding, and does not have any notch, as is different from the flange 24 so that the double-sided adhesive tape 90 can be bonded to the flat part 66 strongly.

A garnish 94 is provided on the inner side of the flange 24. An outer end of the garnish 94 is located near the inner side wall 78 of the trim portion 72. A cover lip 96 projects from the position between the inner side wall 78 and the bottom wall 80 inwardly, and a tip end of the cover lip 96 covers the outer end of the garnish 94 to close a space between the door opening trim weather strip 68 and the garnish 94, thereby effecting a good outer appearance.

FIG. 8 shows the attaching state of the door opening trim weather strip 68 to a different position of the door opening portion 10, in which the outer body panel 26 bends and extends at right angles to the flange 24 to define a generally horizontal flat surface 98, and further bends upwardly.

Upon attaching the door opening trim weather strip 68 to this position of the door opening portion 10, the double-sided adhesive tape 90 bonded to the extension wall 88 is pressed against the flat part 98 to bond the double-sided adhesive tape 90 to the flat part 98. At this time, the bending part 86 bends such that the extension wall 88 makes right angles to the outer side wall 76 to conform to the configuration of the flat part 98. In this case, another double-sided adhesive tape 92 is provided in addition to the double-sided adhesive tape 90. The double-sided adhesive tape 92 is bonded to the inner surface of the outer side wall 76. Upon attachment of the door opening trim weather strip 68, the double-sided adhesive tape 92 is bonded to the outer surface of the flange 24 to attach the door opening trim weather strip 68 to the flange 24 more securely.

Figure 9:
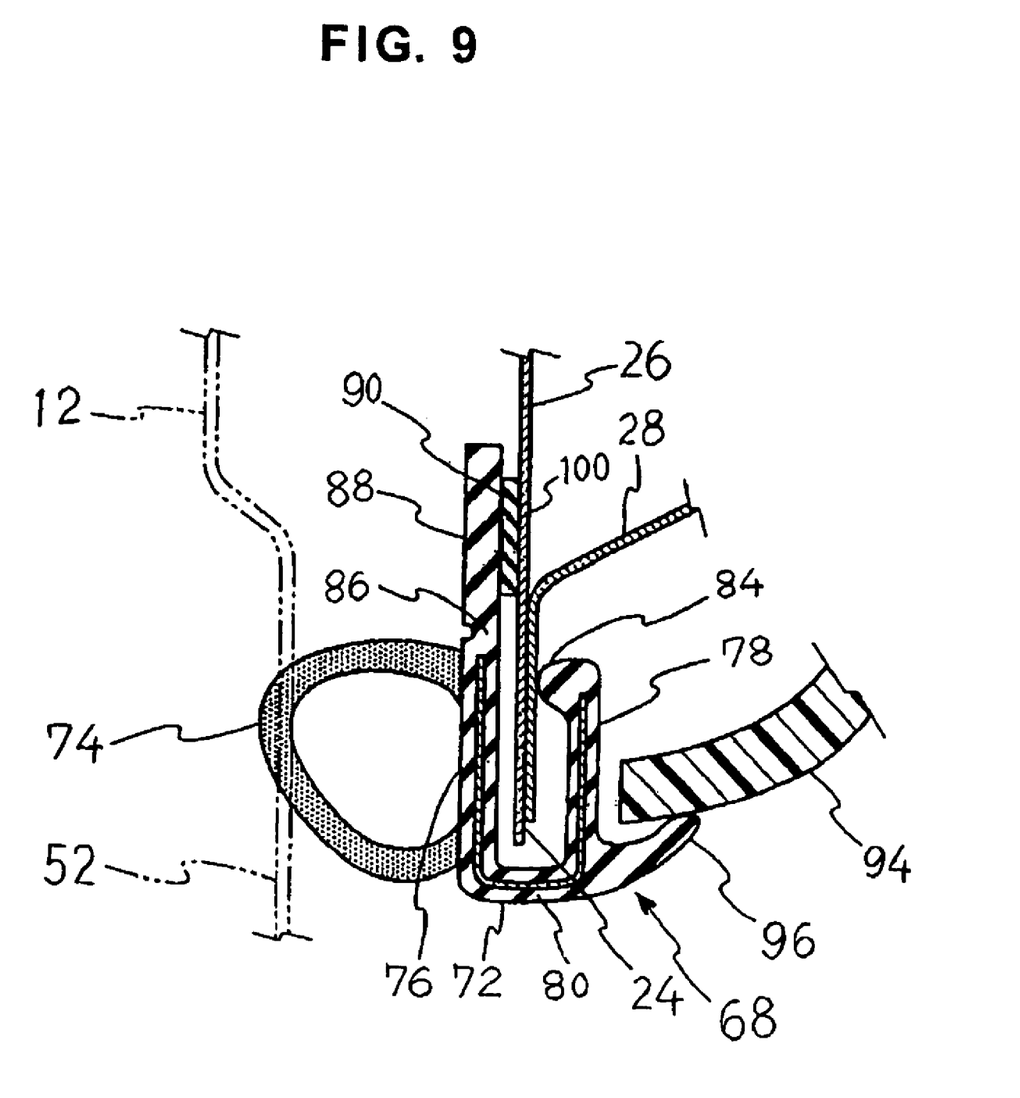
FIG. 9 is a cross-sectional view of the door opening trim weather strip, which is taken along a different line from those of FIGS. 7 and 8.

FIG. 9 shows the attaching state of the door opening trim weather strip 68 to a different position of the door opening portion 10, in which the outer body panel 26 extends upwardly of the flange 24 without bending to define a generally vertically extending flat part 100.

Upon attaching the door opening trim weather strip 68 to this position of the opening portion 10, the double-sided adhesive tape 90 bonded to the extension wall 88 is pressed against the flat part 100 to bond the double-sided adhesive tape 90 to the flat part 100. In this case, the bending part 86 of the trim portion 72 stretches generally vertically to conform to the configuration of the outer body panel 26, and as a result, the double-sided adhesive tape 90 bonded to the extension wall 88 contacts and is bonded to the flat part 100, whereby the door opening trim weather strip 68 can be attached to the door opening portion 10.

Figure 10:
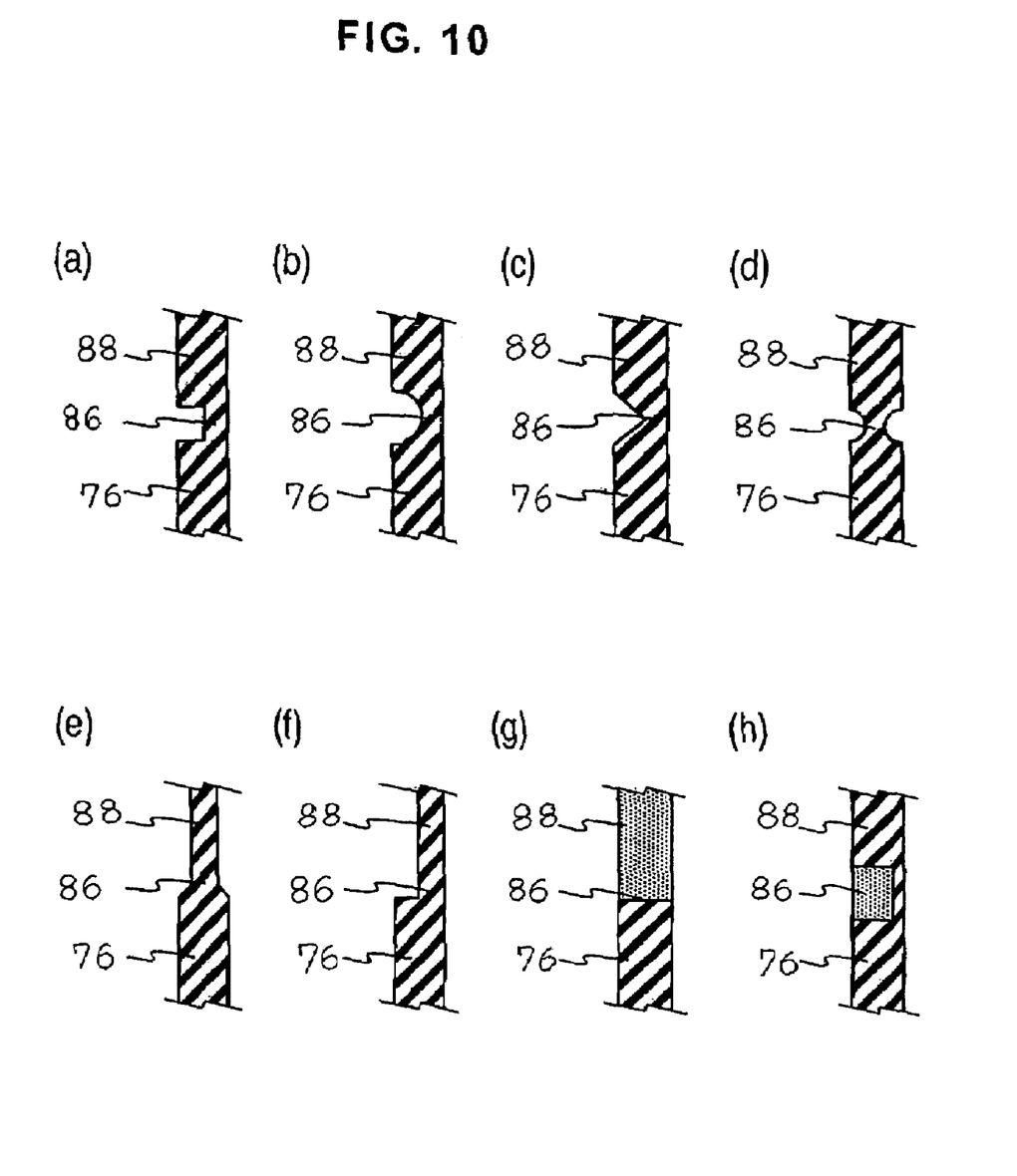
FIG. 10 are partially cut away cross-sectional views showing various configurations of a bending part of the door opening trim weather strip.

FIG. 10 shows various configurations of the bending part 86 provided between the outer side wall 76 and the extension wall 88 of the trim portion 72. As shown in FIG. 10(a), the bending part 86 is defined by forming a depression with a rectangular cross-section along an open end of the outer side wall 76, as shown In FIG. 10(b), the bending part 86 is defined by forming a depression with a semicircular cross-section along an open end of the outer side wall 76, as shown in FIG. 10(c), the bending part 86 is defined by forming a depression with a triangular cross-section along an open end of the outer side wall 76, and as shown in FIG. 10(d), the bending part 86 is defined by forming depressions in both surfaces along an open end of the outer side wall 76. The configuration of each depression in FIG. 10(d) may be arbitrarily selected, considering the flexibility of the bending part 86 as well as the productivity thereof.

Where the bending part 86 has the configurations described above, the bending part 86 readily bends so that the double-sided adhesive tape 90 bonded to the extension wall 88 is favorably bonded to the flat part 66, 98, 100 of the outer body panel 26, whereby the door opening trim weather strip 68 can be attached to the door opening portion 10 securely. Furthermore, since the bending part 86 is defined by forming depressions, it can be readily formed during the extrusion of the door opening trim weather strip 68.

In FIGS. 10(e) and 10(f), the wall thickness of the bending pat 86 and the extension wall 88 are both reduced from that of the outer side wall 76 so that the bending pat 86 and the extension wall 88 can entirely flex. These bending part 86 and the extension wall 88 can be formed during the extrusion of the door opening trim weather strip 68, similarly to the case of the depressions being provided, thereby facilitating the production of the door opening trim weather strip 68.

In FIGS. 10(g), the bending pat 86 and the extension wall 88 are both formed of a soft material such as a sponge material. In FIGS. 10(h), the bending part 86 is defined by forming a depression and filling the depression with a soft material such as a sponge material. By virtue of the bending part 86 composed of the soft material, the extension wall 88 can readily flex along with the bending part 86 so that the double-sided adhesive tape 90 bonded to the extension wall 88 is bonded to the door opening portion 10, whereby the door opening trim weather strip 68 can be attached thereto securely. Furthermore, the bending part 86 composed of the soft material can flexibly bend to conform to the configuration of the door opening portion. In addition, since the depression is filled with the soft material, the depression is not exposed, and accordingly, the bending part 86 is free from dust, etc.

In addition, where the tubular seal portion 74 of the door opening trim weather strip 68 is composed of a sponge material of an EPDM rubber or an olefin thermoplastic elastomer, and the trim portion 72 is composed of a solid material or a finely foamed material of an EPDM rubber or an olefin thermoplastic elastomer, resultant door opening trim weather strip 68 exhibits good weather resistance. These materials are all olefin-based materials so that they can be recycled after pulverized together.

Next, the method for producing the door opening trim weather strip 68 will be explained.

The door opening trim weather strip 68 is formed by extrusion. Where the insert member 82 of metal or a hard synthetic resin is embedded in the trim portion 70, the insert member 82, a solid rubber for the trim portion 72 and a sponge rubber for the tubular seal portion 74 can be integrally extruded with an extruder.

A synthetic rubber such as an EPDM rubber, etc. and a thermoplastic elastomer such as a polyolefin elastomer, etc. are used as the forming material of the door opening trim weather strip 68. The sponge material is prepared by foaming the above-described EPDM rubber and the thermoplastic elastomer.

In case of the synthetic rubber, after extruded, it is heated in a vulcanizing chamber with a hot air and high frequency wave for vulcanizing and foaming. In case of the soft synthetic resin, it is heated during extrusion or after extruded for foaming, and cooled for solidifying. Then, it is cut to predetermined lengths, whereby an extruded part of the door opening trim weather strip 68 is obtained.

Next, the door opening trim weather strip 68 thus produced is cut to predetermined dimensions, and attached to the flange 24 provided in the door opening portion 10 of the vehicle body.

The door opening trim weather strip 68 is attached to the flange 24 by inserting the flange 24 in the trim portion 72. Alternatively, the door opening trim weather strip 68 may be attached to the flange 24 by temporarily fixing the trim portion 72 to the flange with side walls of the trim portion 72 slightly spread apart, and fixing the temporarily y fixed trim portion 72 to the flange 24 with the roll forming method.

As described above, with the weather strip of the present invention, the extension wall extends from the open end of the outer side wall of the base portion by way of the bending part, and the extension wall is bonded to the body panel of the opening portion of the vehicle body, etc. which is adjacent to the flange, with the double-sided adhesive tape. The bending part bends according to the configuration of the closing member or the opening portion, which is adjacent to the flange, to enable the extension wall to contact the closing member or the opening portion, and consequently, the double-sided adhesive tape bonded to the extension wall is bonded to the closing member or the opening portion, thereby surely attaching the weather strip irrespective of the configuration of the flange.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip for a motor vehicle, which is capable of providing a seal between an opening portion of a vehicle body, and a closing member for closing the opening portion, comprising:
   a base portion in which a flange provided in one of the opening portion of the vehicle body and the closing member is adapted to be inserted; and
   a seal portion integrally formed with said base portion for contacting one of the opening portion and the closing member, and sealing between the opening portion and the closing member,
   wherein an insert member is embedded in said base portion, and said base portion has one of a generally U-shaped cross-section and a generally J-shaped cross-section and includes an outer side wall, an inner side wall and a bottom wall, said outer side wall has a bending part along an open end of said outer side wall, an extension wall extends from said bending part, and said extension wall is bonded to a body panel defining one of said opening portion and said closing member, which is adjacent to said flange, with a double-sided adhesive tape over the entire length of said weather strip with a bending angle of said bending part locally varied.

2. A weather strip for a motor vehicle as claimed in claim 1, wherein said bending part is formed to have a thin wall thickness.

3. A weather strip for a motor vehicle as claimed in claim 1, wherein said bending part is composed of a soft material.

4. A weather strip as claimed in claim 1, wherein said insert member is separable in said base portion into a plurality of insert pieces.

5. A weather strip as claimed in claim 1, wherein an insert member is embedded in said base portion so as to be contractible and stretchable in said base portion.

6. A weather strip as claimed in claim 1, wherein said base portion is composed of a solid material, and said seal portion is composed of a sponge material and is formed to have a tubular configuration.

7. A weather strip as claimed in claim 1, wherein said seal portion is composed of a sponge material of one of an EPDM rubber and a thermoplastic olefin elastomer, and said base portion is composed of one of a solid material and a foamed material, wherein each of the solid material and the foamed material is made of one of an EPDM rubber and a thermoplastic olefin elastomer.

8. A weather strip for a motor vehicle, which is capable of providing a seal between an opening portion of a vehicle body, and a closing member for closing the opening portion, comprising:
   a base portion in which a flange provided in one of the opening portion of the vehicle body and the closing member is adapted to be inserted; and
   a seal portion integrally formed with said base portion for contacting one of the opening portion and the closing member, and sealing between the opening portion and the closing member,
   wherein an insert member is embedded in said base portion, and said base portion has one of a generally U-shaped cross-section and a generally J-shaped cross-section and includes an outer side wall, an inner side wall and a bottom wall, said outer side wall has a bending part along an open end of said outer side wall, an extension wall extends from said bending part, and said extension wall is bonded to a body panel defining one of said opening portion and said closing member, which is adjacent to said flange, with a first double-sided adhesive tape, wherein an inner surface of said outer side wall of said base portion is bonded to said flange with a second double-sided adhesive tape.

* * * * *